United States Patent
Mashue et al.

(10) Patent No.: US 8,696,314 B2
(45) Date of Patent: Apr. 15, 2014

(54) GEAR SET, WIND TURBINE INCORPORATING SUCH A GEAR SET AND METHOD OF SERVICING A WIND TURBINE

(75) Inventors: Aaron John Mashue, Simpsonville, SC (US); Bradley Graham Moore, Greenville, SC (US); Kurt Goodwin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 12/815,910

(22) Filed: Jun. 15, 2010

(65) Prior Publication Data

US 2011/0142617 A1   Jun. 16, 2011

(51) Int. Cl.
  *A47C 7/74* (2006.01)
  *B63H 1/00* (2006.01)
  *F01D 25/00* (2006.01)

(52) U.S. Cl.
  USPC ..................................... 416/170 R

(58) Field of Classification Search
  USPC ........... 415/122.1, 229; 416/170 R; 29/889.1; 475/344, 180; 74/384, 385, 420, 421 R, 74/460, 468
  See application file for complete search history.

(56) References Cited

U.S. PATENT DOCUMENTS

| | | | |
|---|---|---|---|
| 4,330,713 A | 5/1982 | Greenwood | |
| 6,465,901 B2 | 10/2002 | Croes | |
| 6,783,326 B2 | 8/2004 | Weitkamp | |
| 6,790,156 B2 | 9/2004 | Hoesle | |
| 8,276,450 B2 * | 10/2012 | Engelbreit et al. | 73/593 |
| 2005/0014597 A1 | 1/2005 | Michaud et al. | |
| 2005/0186105 A1 * | 8/2005 | Jo | 420/110 |
| 2007/0078038 A1 | 4/2007 | Ando et al. | |
| 2008/0038138 A1 | 2/2008 | O'Brien, II | |
| 2008/0194377 A1 * | 8/2008 | Mordukhovich et al. | 475/331 |
| 2009/0220343 A1 * | 9/2009 | Dimascio et al. | 416/161 |

FOREIGN PATENT DOCUMENTS

| | | |
|---|---|---|
| CN | 201106554 Y | 8/2008 |
| EP | 1184567 A2 | 3/2002 |
| EP | 1788238 | 5/2007 |
| EP | 1788238 A2 | 5/2007 |
| EP | 2345749 A1 * | 7/2011 |
| JP | 5172193 A | 7/1993 |
| WO | 2004/022273 A2 | 3/2004 |
| WO | WO 2009133161 A2 * | 11/2009 |

OTHER PUBLICATIONS

Search Report and Written Opinion from corresponding EP Application No. 11169118.4 dated Jan. 27, 2012.

* cited by examiner

*Primary Examiner* — Edward Look
*Assistant Examiner* — Christopher J Hargitt
(74) *Attorney, Agent, or Firm* — Global Patent Operation; Douglas D. Zhang

(57) ABSTRACT

A gear set is disclosed. The gear set includes a bearing including an inner race and an outer race, one of the inner race and the outer race being a ring gear including a plurality of first teeth having a first hardness; and a pinion meshable with the ring gear, and including a plurality of second teeth having a second hardness. The second hardness is no greater than the first hardness. A wind turbine incorporating such a gear set and a method of servicing a wind turbine are also disclosed.

20 Claims, 5 Drawing Sheets

GEAR SET, WIND TURBINE INCORPORATING SUCH A GEAR SET AND METHOD OF SERVICING A WIND TURBINE

BACKGROUND OF THE INVENTION

The present disclosure generally relates to a gear set, and more particularly to a gear set that can be used for pitching, for example, a blade of a rotor of a wind turbine, a wind turbine incorporating such a gear set, and a method of servicing a wind turbine.

Wind turbines have received increased attention as an environmentally safe and relatively inexpensive alternative energy source. With this growing interest, considerable efforts have been made to develop wind turbines that are reliable and efficient.

A wind turbine typically includes a rotor comprised of a hub and a plurality of blades mounted on the hub. The blades of the rotor transform wind energy into a rotational torque or force that drives a generator. The rotor is typically coupled to the generator through a drive train, which typically includes, among other things, a gearbox. The gearbox steps up the inherently low rotational speed of the rotor for the generator to efficiently convert the rotational mechanical energy to electrical energy, which can be fed into a grid. The gearbox, the generator and other related components are typically mounted within a housing or nacelle, which is positioned on top of a truss or tubular tower.

Some wind turbines employ a pitch drive unit to change or adjust a pitch angle of each blade. The pitch angle is an angle that determines a blade's orientation about its pitch axis. In such configuration, each blade is attached to the hub through a pitch bearing which typically includes an inner race and an outer race. More specifically, the outer race is typically releasably attached to the hub, and the inner race is a ring gear that is typically releasably attached to a respective blade so that the blade is rotatable relative to its pitch axis and the hub. The pitch drive unit includes a drive gear or pinion that meshes with the ring gear, and a motor for driving the drive gear. The motor is typically supported by the hub.

In existing wind turbines, the drive gear is harder than the pitch bearing. That is, the drive gear has a hardness that is greater than the hardness of the ring gear of the pitch bearing. As a result, the ring gear is the wear component, which wears out first and needs to be replaced when the ring gear reaches its expected operational life. Replacing the ring gear typically requires detaching the rotor from the drive train and using a relatively large, land-based or vessel-based crane to lower the rotor from the top of the tower. Then on the ground, the blade is removed and the relevant pitch bearing is replaced. Relatively large cranes are needed because the rotors can be very large and heavy—wind turbines designed to provide electricity to a utility grid, for example, can have rotors of 30 or more meters in diameter. This approach is time-consuming, relatively complicated and expensive.

Accordingly, it would be desirable to provide a gear set, a wind turbine incorporating such a gear set and a method of servicing a wind turbine, which address at least some of the problems identified above.

BRIEF DESCRIPTION OF THE INVENTION

As described herein, the exemplary embodiments overcome one or more of the above or other disadvantages known in the art.

One aspect of the exemplary embodiments relates to a gear set which includes a bearing including an inner race and an outer race, one of the inner race and the outer race being a ring gear including a plurality of first teeth having a first hardness; and a pinion meshable with the ring gear, and including a plurality of second teeth having a second hardness. The second hardness is no greater than the first hardness.

Another aspect of the exemplary embodiments relates to a wind turbine which includes a first component; a second component; a bearing including an inner race and an outer race, one of the inner race and the outer race being a ring gear connected to one of the first component and the second component, the ring gear including a plurality of first teeth having a first hardness, the other of the inner race and the outer race being connected to the other of the first component and the second component; and a drive unit stationarily disposed relative to the other of the first component and the second component, the drive unit including a drive gear meshing with the ring gear, and including a plurality of second teeth having a second hardness. The second hardness is no greater than the first hardness.

A further aspect of the exemplary embodiments relates to a method of servicing a wind turbine. The wind turbine includes a first component; a second component; a bearing including an inner race and an outer race, one of the inner race and the outer race being a ring gear connected to one of the first component and the second component and including a plurality of first teeth having a first hardness, the other of the inner race and the outer race being connected to the other of the first component and the second component; and a drive unit stationarily disposed relative to the other of the first component and the second component, the drive unit including a drive gear meshing with the ring gear, and including a plurality of second teeth having a second hardness greater than the first hardness. The method includes replacing the drive gear with a replacement drive gear comprising third teeth having a third hardness no greater than the first hardness when the first teeth of the ring gear reach a predetermined percent of their expected operational life.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE INVENTION

Figure 1:
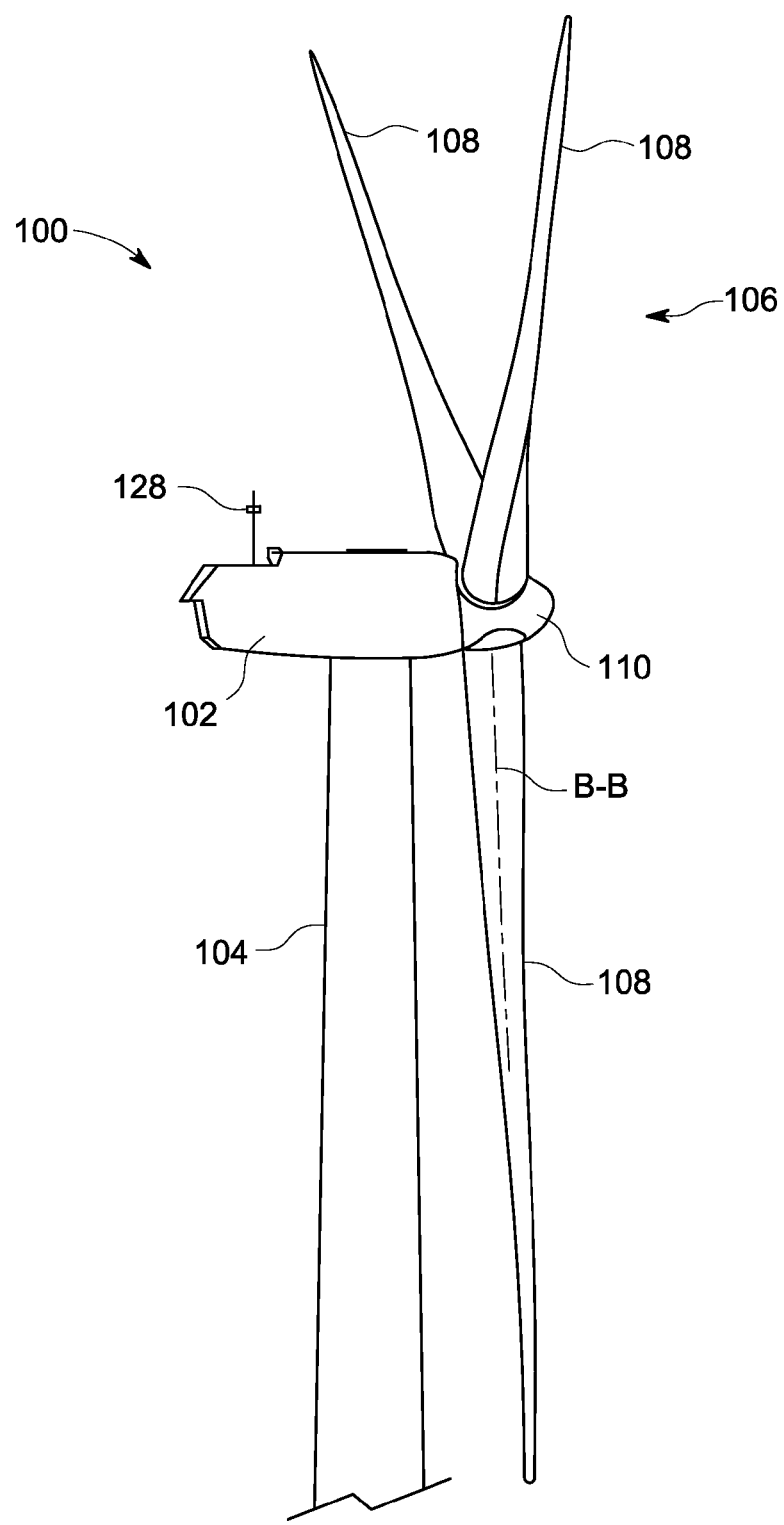
FIG. 1 is a side elevational view of a wind turbine incorporating aspects of the present disclosure.

FIG. 1 illustrates an exemplary wind turbine 100 incorporating aspects of the present disclosure. The wind turbine 100 includes a nacelle 102 and a rotor 106. The nacelle 102 is a housing mounted atop a tower 104, only a portion of which is shown in FIG. 1. The nacelle 102 houses a generator (not shown in FIG. 1). The height of the tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. The rotor 106 includes one or more turbine blades 108 attached to a rotatable hub 110. In this exemplary embodiment, the rotor 106 has three turbine blades 108.

Figure 2:
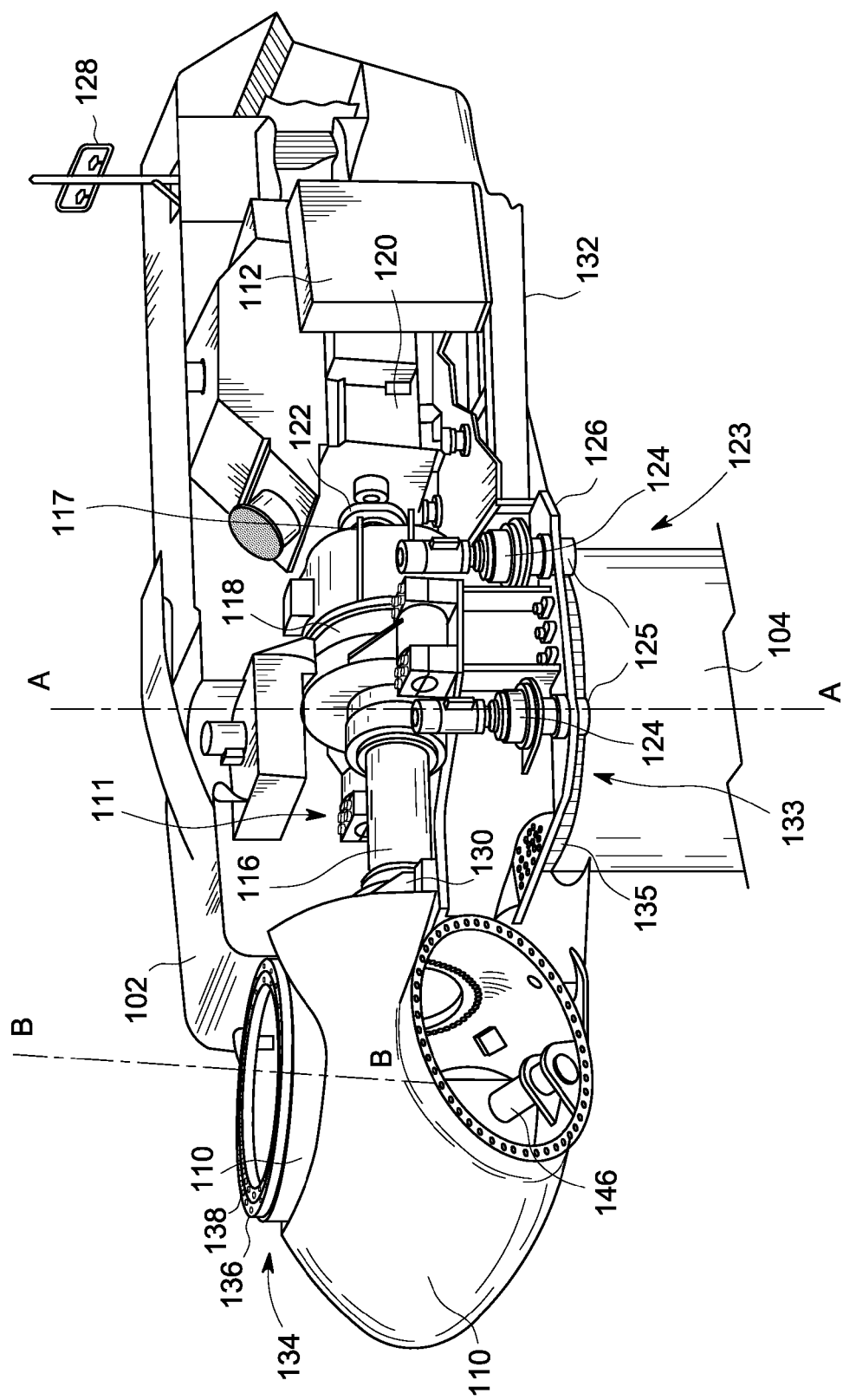
FIG. 2 is a partially cut-away, perspective view of the hub and the nacelle of the wind turbine of FIG. 1.

Referring now to FIG. 2, the drive train 111 of the wind turbine 100 includes a main rotor shaft 116 (also known and referred to as a low-speed shaft) which is connected to the hub 110 via a main bearing 130. In this no-limiting, exemplary embodiment, the drive train 111 also includes a gearbox 118, one end of which is connected to the low speed shaft 116 and the other end of which is connected to a high-speed shaft 117. The high-speed shaft 117 is in turn connected to a generator 120, preferably via a coupling 122. In other embodiments, the main rotor shaft 116 may be connected to the generator 120 directly without a gearbox.

The wind turbine 100 also includes a yaw adjustment system 123 that can be used to rotate the nacelle 102 on the axis A-A relative to the tower 104 to control the perspective of the rotor 106 with respect to the direction of the wind. In this no-limiting, exemplary embodiment, the yaw adjustment system 123 include a yaw deck 126 attached to the mainframe 132 of the nacelle 102, yaw drive units 124 mounted on the yaw deck 126 to engage the ring gear 135 of a yaw bearing 133 through respective drive gears 125. As is known in the art, the nacelle 102 is rotatably mounted on the tower 104 through the yaw bearing 133. In FIG. 2, the outer race of the yaw bearing 133 is the ring gear 135 which is attached to the tower 104 by, for example, a plurality of fasteners such as studs; similarly, the inner race (not shown) of the yaw bearing 133 is attached to the nacelle 102 by, for example, a plurality of fasteners such as studs. The structure of the yaw bearing 133 and how its outer race 135 and inner race are connected to the tower 104 and the nacelle 102, respectively, are known in the art, and therefore will not be discussed in greater detail here. A sensor such as a wind vane 128 and/or an anemometer is provided on the top of the nacelle 102 to provide information regarding the direction and/or the speed of the wind to a control unit 112 of the wind turbine 100.

Figure 3:
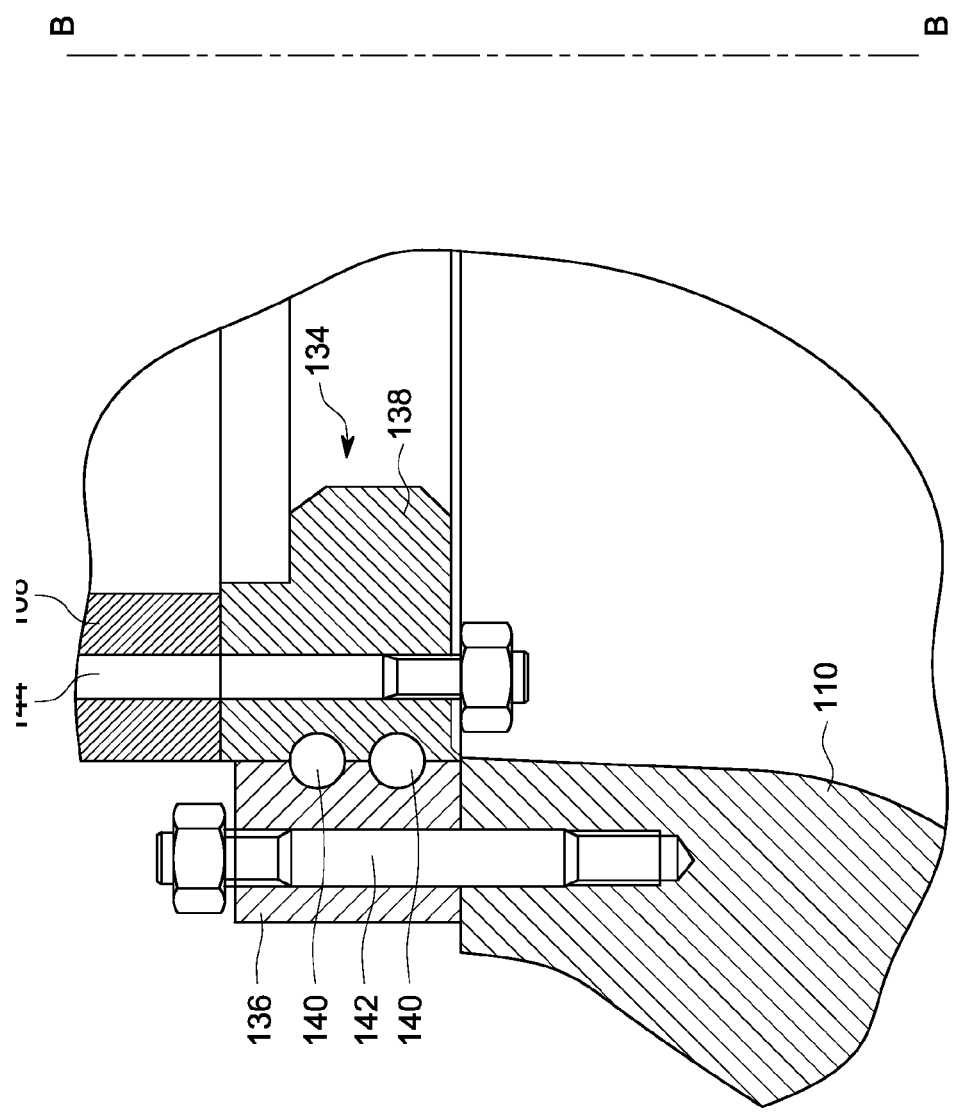
FIG. 3 is an enlarged, partial, cross section view of the pitch bearing of the wind turbine of FIG. 2.

Still referring to FIGS. 1 and 2, each turbine blade 108 is attached to the hub 110 through a pitch bearing 134. One pitch bearing 134 is schematically illustrated in FIG. 2. As is shown in FIG. 3 and known in the art, the pitch bearing 134 includes an outer race 136, an inner race 138, and rolling elements or bearings 140 disposed between the outer race 136 and the inner race 138. In this no-limiting, exemplary embodiment, the outer race 136 is attached to the hub 110 by, for example, a plurality of fasteners 142 such as studs or bolts and nuts; similarly, the inner race 138 is attached to the respective turbine blade 108 by, for example, a plurality of fasteners 144 such as studs or bolts and nuts. The structure of the pitch bearing 134 and how its outer race 136 and inner race 138 are connected to the hub 110 and the turbine blade 108, respectively, are known in the art, and therefore will not be discussed in greater detail here. In some configurations, instead of using a pitch bearing to connect a turbine blade to a rotor, the turbine blade has two blade sections which are connected to each other by a pitch bearing. The inner blade section of the turbine blade is stationarily attached to the rotor. In the present application, the term "blade" is used to also refer to the outer blade section of such turbine blade, and the term "rotor" is used to also refer to the rotor and the inner blade section in such configurations.

Figure 4:
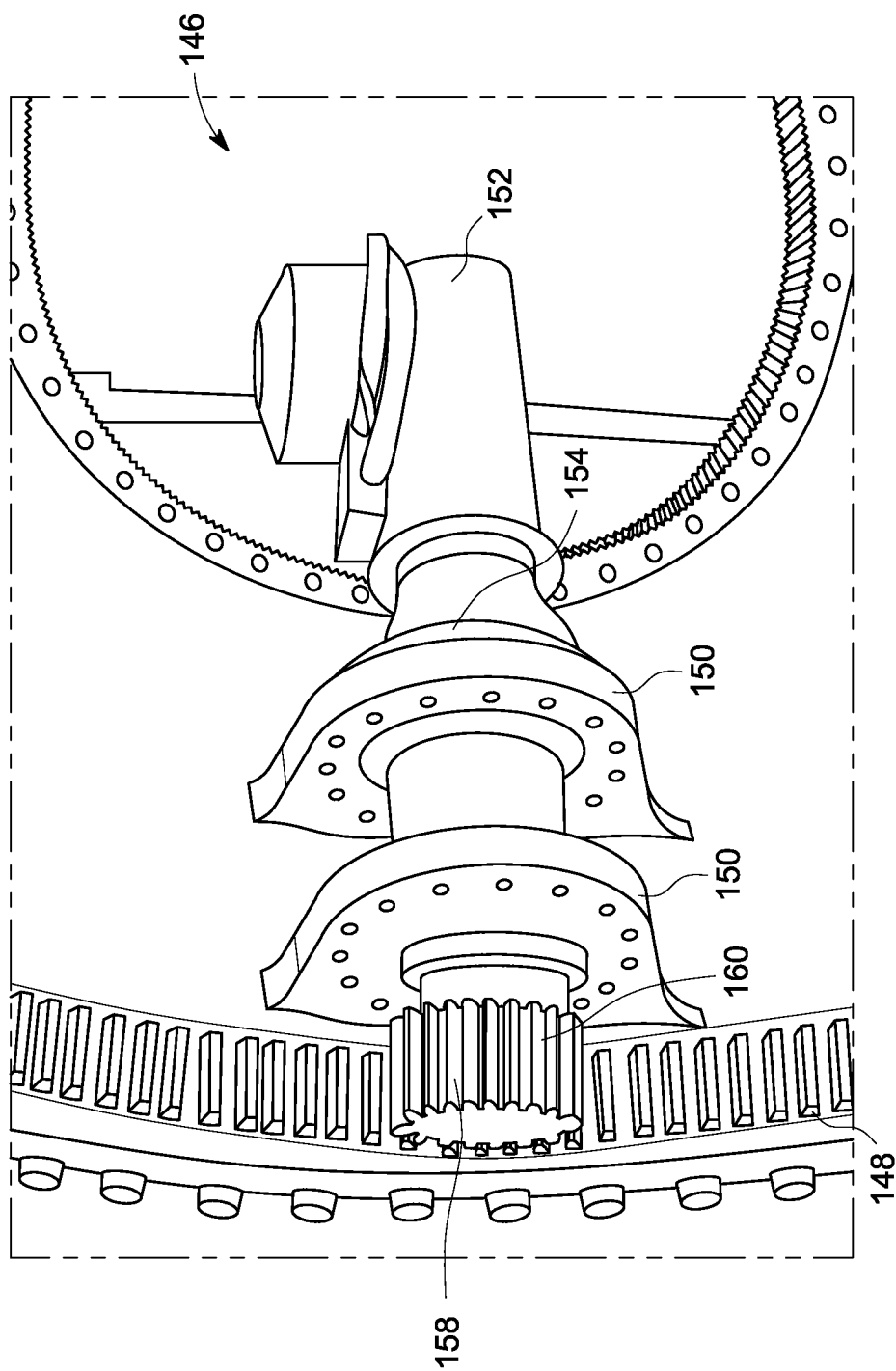
FIG. 4 is an enlarged, perspective view of the ring gear and the pitch drive unit of the wind turbine of FIG. 2.
Figure 5:
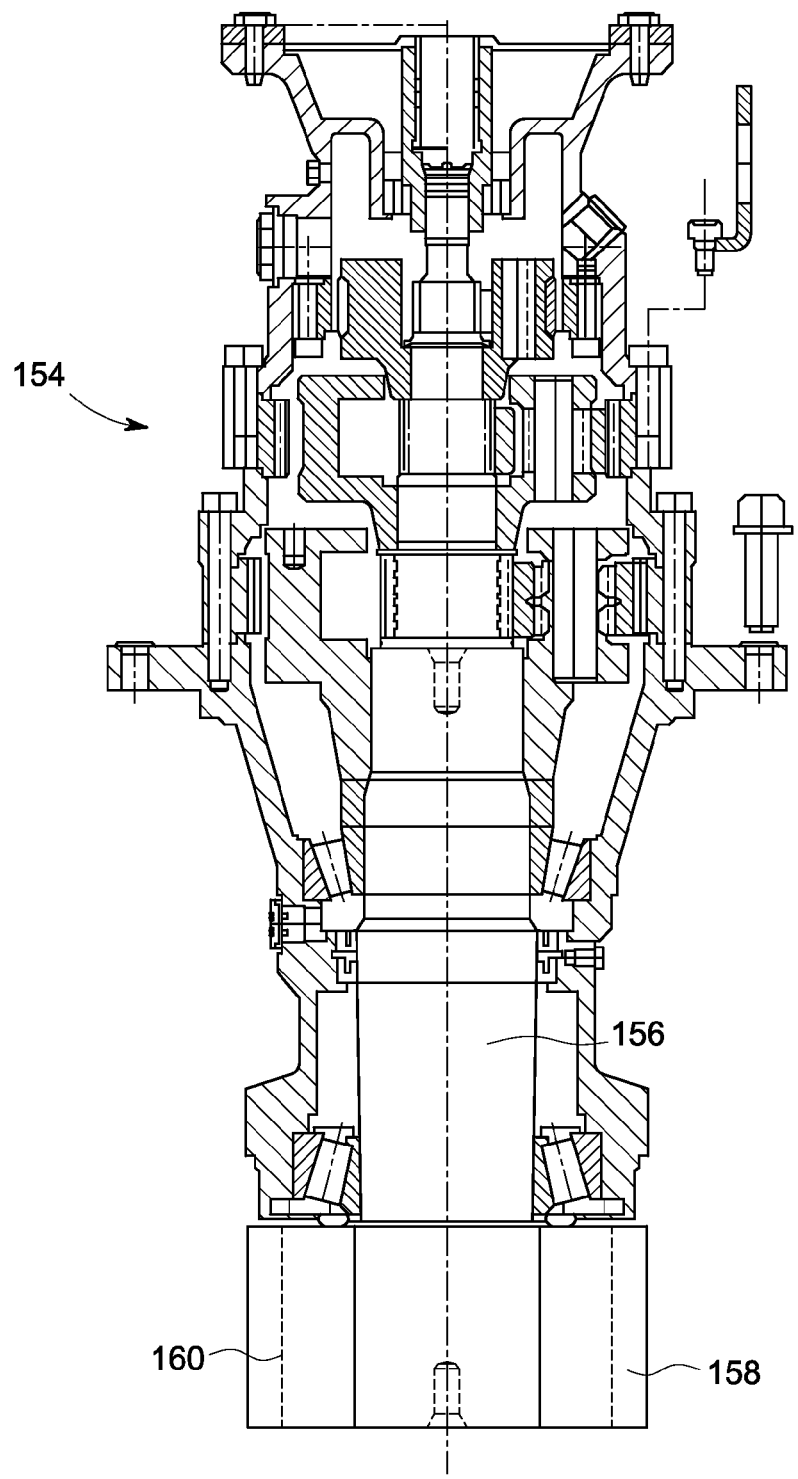
FIG. 5 is an enlarged, cross section view of the gearbox and the drive gear of the pitch drive unit of FIG. 4.

In this no-limiting, exemplary embodiment, the inner race 138 is a ring gear having a plurality of teeth 148 on its inner peripheral surface (FIG. 4). The pitch bearing 134 including the ring gear 138 and its teeth 148, is preferably made of an alloy, such as an alloy containing Cr or Mo such as, for example, 17CrNiMo6 or 42CrMo4QT. The pitch bearing 134 has hardness in the range from 28 HRC to 58 HRC, preferably in the range from 28 HRC to 34 HRC or from 48 HRC to 58 HRC.

By this arrangement, the turbine blade 108 can be pitched by a pitch drive unit 146 (shown in FIGS. 2 and 4) relative to the hub 110 about its pitch axis B-B in response to a control signal from the control unit 112. More specifically, the pitch drive unit 146, which can be mounted to the hub 110 through a pair of mounting brackets 150, includes a reversible motor 152, a rotation speed reduction gearbox 154 driven by the motor 152 and having a shaft 156, and a drive gear or pinion 158 coaxially with the shaft 156 and having teeth 160 meshing with the teeth 148 of the ring gear 138. The gearbox 154 is optional as the motor 152 can directly drive the drive gear 158.

The shaft 156 and the drive gear 158 can be manufactured as a one-piece element, or as two separate pieces and then connected to each other by suitable means. For example, when the shaft 156 and the drive gear 158 are manufactured as two separate pieces, they can releasably connected to each other by at least one spline (not shown) which provides the torsional/radial constraint, and by at least one bolt (not shown) which provides the axial constraint. The advantages of using two separate pieces will be explained below.

The drive gear 158 including its teeth 160 is preferably comprised of an alloy, such as an alloy containing Cr or Mo such as, for example, 17CrNiMo6 or 42CrMo4QT, and has a hardness which is no greater than the hardness of the pitch bearing 134. In one no-limiting, exemplary embodiment, the hardness of at least the teeth 160 is substantially the same as the hardness of the teeth 148 of the ring gear 138. In another embodiment, the hardness of at least the teeth 160 is lower than the hardness of the teeth 148 of the ring gear 138. As a result, the ring gear 134 is no longer the designated wear component. Rather, the drive gear 158 should wear out before the ring gear 134 because its teeth 160 are used more often than the teeth 148 of the ring gear 134 because at least during some operations the drive gear 158 would typically have a rotation higher than that of the ring gear 134 during operation. At least with this arrangement, the drive gear 158 can be treated as the wear component. This provides some substantial advantages. For example, since the drive gear 158 is the wear component, it is now possible to replace the drive gear 158 on a regular basis. Due to its size and weight, the drive gear 158 can be replaced without using any crane or lifting device when the drive gear 158 and the shaft 156/the gearbox 154 are two separate pieces. Even when the drive gear 158 and the shaft 156/the gearbox 154 are of one-piece design, they can be replaced by using a hub-based crane. In other words, no relatively large, land-based or vessel-based crane is needed to replace the drive gear 158 and/or the gearbox 154 in accordance with the present disclosure. This approach substantially shortens the replacement time, simplifies the replacement process, and reduces the replacement costs.

Even when the hardness of the teeth 160 of the drive gear 158 is different from the hardness of the teeth 148 of the ring gear 138, the same material can be used for making the teeth 160 and 148. In such situations, different treatments will be used to achieve different hardness. Of course, when the hardness is different, different materials may be used for making the teeth 160 and 148, respectively.

The same approach can also be used to service the existing wind turbines where the teeth of the drive gear are harder than the teeth of the ring gear. More specifically, instead of letting the ring gear reach its expected operational life and then replacing it with a new pitch bearing, one can replace the drive gear when the ring gear reaches a predetermined percentage of its expected operational life. By way of example, the predetermined percentage could be when the teeth of the ring gear lose approximately 40 percent to 50 percent of their materials. The loss can be determined by known methods such as visual inspection. Preferably, the teeth of the replacement drive gear have a hardness which is no greater than that of the teeth of the ring gear. In one embodiment, the hardness of the teeth of the replacement drive gear is substantially the same as that of the teeth of the ring gear.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, in another embodiment, the outer race 136 of the pitch bearing 134 could be the ring gear, and the pitch drive unit 146 could be mounted on the respective blade 108. Similarly, in yet another embodiment, the inner race of the yaw bearing 133 could be the ring gear, and the yaw drive units 124 could be mounted on the tower 104 instead. Moreover, the same inventive approaches can be used on or to replace the drive gears 125 for the yaw bearing 133. Furthermore, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gear set comprising:
    a bearing comprising an inner race and an outer race, one of the inner race and the outer race being a ring gear comprising a plurality of first teeth having a first hardness; and
    a pinion meshable with the ring gear, and comprising a plurality of second teeth having a second hardness,
    wherein the second hardness is no greater than the first hardness.

2. The gear set of claim 1, wherein the first teeth or the second teeth comprise an alloy.

3. The gear set of claim 2, wherein the alloy comprises 17CrNiMo6 or 42CrMo4QT.

4. The gear set of claim 1, wherein the first hardness is in the range from 28 HRC to 58 HRC.

5. The gear set of claim 1, wherein the second hardness is substantially the same as the first hardness.

6. A wind turbine comprising:
    a first component;
    a second component;
    a bearing comprising an inner race and an outer race, one of the inner race and the outer race being a ring gear connected to one of the first component and the second component, the ring gear comprising a plurality of first teeth having a first hardness, the other of the inner race and the outer race being connected to the other of the first component and the second component; and
    a drive unit stationarily disposed relative to the other of the first component and the second component, the drive unit comprising a drive gear meshing with the ring gear, and comprising a plurality of second teeth having a second hardness,
    wherein the second hardness is no greater than the first hardness.

7. The wind turbine of claim 6, wherein the first teeth or the second teeth comprise an alloy.

8. The wind turbine of claim 7, wherein the alloy comprises Cr or Mo.

9. The wind turbine of claim 6, wherein the first hardness is in the range from 28 HRC to 58 HRC.

10. The wind turbine of claim 9, wherein the first hardness is in the range from 28 HRC to 34 HRC or from 48 HRC to 58 HRC.

11. The wind turbine of claim 6, wherein the drive unit further comprises a gearbox comprising a shaft which is coaxial with the drive gear.

12. The wind turbine of claim 11, wherein the drive gear and the shaft are manufactured as two separate pieces.

13. The wind turbine of claim 11, wherein the drive gear and the shaft are manufactured as a one-piece element.

14. The wind turbine of claim 6, wherein the first component is a hub of the wind turbine, the second component is a blade of the wind turbine, and the drive unit further comprises a motor supported by the hub and drivingly connected to the drive gear.

15. The wind turbine of claim 6, wherein the first component is a tower of the wind turbine, and the second component is a nacelle of the wind turbine, and the drive unit further comprises a motor supported by the nacelle and drivingly connected to the drive gear.

16. The wind turbine of claim 6, wherein the second hardness is substantially the same as the first hardness.

17. A method of servicing a wind turbine, the wind turbine comprising a first component; a second component; a bearing comprising an inner race and an outer race, one of the inner race and the outer race being a ring gear connected to one of the first component and the second component and comprising a plurality of first teeth having a first hardness, the other of the inner race and the outer race being connected to the other of the first component and the second component; and a drive unit stationarily disposed relative to the other of the first component and the second component, the drive unit comprising a drive gear meshing with the ring gear, and comprising a plurality of second teeth having a second hardness greater than the first hardness, the method comprising:
    replacing the drive gear with a replacement drive gear comprising third teeth having a third hardness no greater than the first hardness when the first teeth of the ring gear reach a predetermined percent of their expected operational life.

18. The method of claim 17, wherein the first teeth of the ring gear reach the predetermined percent when the first teeth lose approximately 50 percent of their material.

19. The method of claim 17, wherein the first hardness is in the range from 28 HRC to 58 HRC.

20. The method of claim 17, wherein the third hardness is substantially the same as the first hardness.

* * * * *